Jan. 1, 1963

S. KLEIN ETAL 3,071,353

ROTARY MIXING BLADE

Filed March 13, 1961

INVENTORS
SIDNEY KLEIN
HERMAN HOCKEMEYER
BY

S.B. Schlessel

ATTORNEY

Jan. 1, 1963

S. KLEIN ETAL 3,071,353

ROTARY MIXING BLADE

Filed March 13, 1961

INVENTORS
SIDNEY KLEIN
BY HERMAN HOCKEMEYER

*S. B. Schlessel*

ATTORNEY

United States Patent Office 3,071,353
Patented Jan. 1, 1963

3,071,353
ROTARY MIXING BLADE
Sidney Klein, 484 Duryea Terrace, West Hempstead, N.Y., and Herman Hockemeyer, 33 Hudson Terrace, Englewood Cliffs, N.J.
Filed Mar. 13, 1961, Ser. No. 95,175
10 Claims. (Cl. 259—134)

This invention relates to the field of heavy duty mixing machines, and has for its objective the creation of a rotary mixing blade, to be used with such a machine, that will disperse, deagglomerate, dissolve and emulsify solid and semi-solid chemical products in a liquid base with great speed and efficiency.

It is therefore the principal object of our invention to create a rotary mixing blade, for rotative action on a motor shaft, which can rapidly shred and break apart large chunks of pigment agglomerates and other solid and semi-solid chemical materials and reduce them to particle size, and to disperse, dissolve and emulsify them in a liquid base.

Another important object of our invention lies in the provision of a rotary mixing blade so constructed as to provide a three-way action in reducing such materials by the simultaneous shredding, rubbing and smashing of the chemical materials into the liquid base in a repeated and continuing action.

A third important object of our invention lies in the provision of a rotary mixing blade so constructed as to prevent vortexing and air-entrapment in the circulation of the material by causing the blade to be constantly covered by the material mixture in the course of the normal mixing swirl.

Still another important object of our invention lies in the creation of a rotary mixing blade which is readily and easily dismantled for cleaning, and as easily reassembled.

Other salient objects, advantages and functional features will be more readily appreciated by an examination of the detailed specification herein, taken with the accompanying drawings, wherein.

Similar reference characters designate similar parts throughout the different views.

Figure 1:
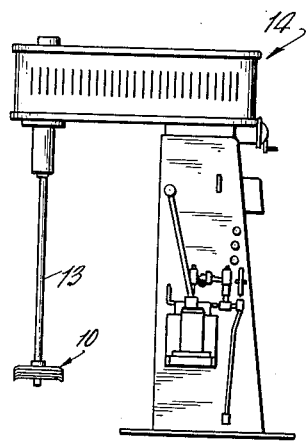
FIG. 1 is a side view of a preferred embodiment of our rotary mixing blade, assembled on the shaft of a heavy duty mixing machine.

Referring now to the drawings, the rotary mixing blade 10 comprises a solid circular disc 11 which is centrally provided with an opening 12 by means of which the mixing blade 10 is secured to a shaft 13 of a mixing machine 14, the shaft 13 being in engagement with and rotated by a heavy duty, variable speed motor (not shown) incased in the machine 14. Opening 12a on either side of opening 12 provide further engagement of the mixing blade 10 with the shaft 13 for greater rigidity.

A plurality of teeth 15 are provided integral with the upper surface 11a of the disc 11, regularly spaced circuitously near the outer perimeter of the disc 11 and concentric with it. A plurality of teeth 15 are also provided integral with the undersurface 11b of the disc 11, disposed in the same circuitous manner, the upper and lower teeth 15 occupying alternate positions as shown.

Figure 6:
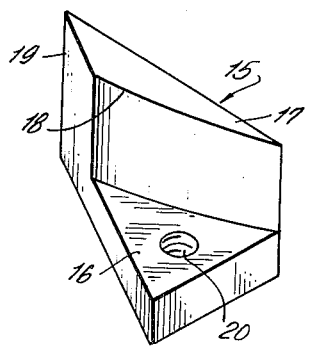
FIG. 6 is an enlarged perspective view of one of the cutting teeth of the mixing blade.

As shown by FIG. 6, each of the teeth 15 has a base 16 and a substantially triangular raised portion 17, one wall 18 of which is curved, facing the perimeter of the disc 11 and concentric with it, for the purpose to be hereinafter explained. The edge 19 of the tooth 15, opposite the curved wall 18, is sharpened and forms the cutting edge of the tooth 15. Each of the teeth 15 is further provided with a threaded bore 20 in its base portion 16.

A pair of substantially flat rings 21 and 22 are provided on the upper surface of the disc 11, the inner perimeter of each of which is adapted to abut the curved walls 18 of the teeth 15, while their outer perimeters are parallel to and concentric with the perimeter of the disc 11. The ring 21 is provided with a plurality of openings 23 adapted to come in registry with the threaded bores 20 of the teeth 15, and to be secured thereto by means of short screws 24, the bases 16 of the teeth 15 acting as spacers to space the ring 21 from the disc 11 in parallel relationship. The ring 21 is further provided with a second series of openings 25, in alternate series with the openings 23 and in registry with the remaining threaded bores 20 of the teeth 15. The ring 22 is provided with a series of openings 26 adapted to come in registry with the openings 25 in ring 21 and threaded bores 20 in teeth 15, and to be secured to these teeth 15 and intermediate ring 21 by means of longer screws 27. Spacing elements 28 are provided around the openings 26, at the undersurface of the ring 22, so that the ring 22, when secured to the disc 11 in this fashion, is spaced from the ring 21 the same distance that the ring 21 is spaced from the disc 11, the ring 22 being likewise parallel with the disc 11, as shown.

The inner area of each of the rings 21 and 22 and of the disc 11 is flat, and parallel to each other. The outer rims of the rings 21 and 22, and of the disc 11, are each provided with an identical downward curve, as shown, remaining parallel to each other, and aligned at their outer peripheries, so that matter forced through the slots created by the rings 21 and 22 with the disc 11, forced outwardly, is deflected downwardly.

Figure 3:
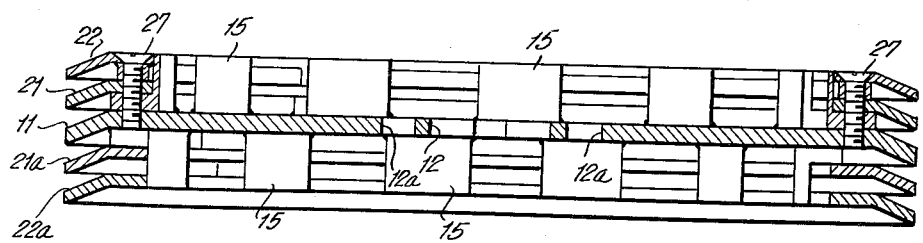
FIG. 3 is an enlarged, cross-sectional view, taken on lines 3—3 of FIG. 2.
Figure 4:
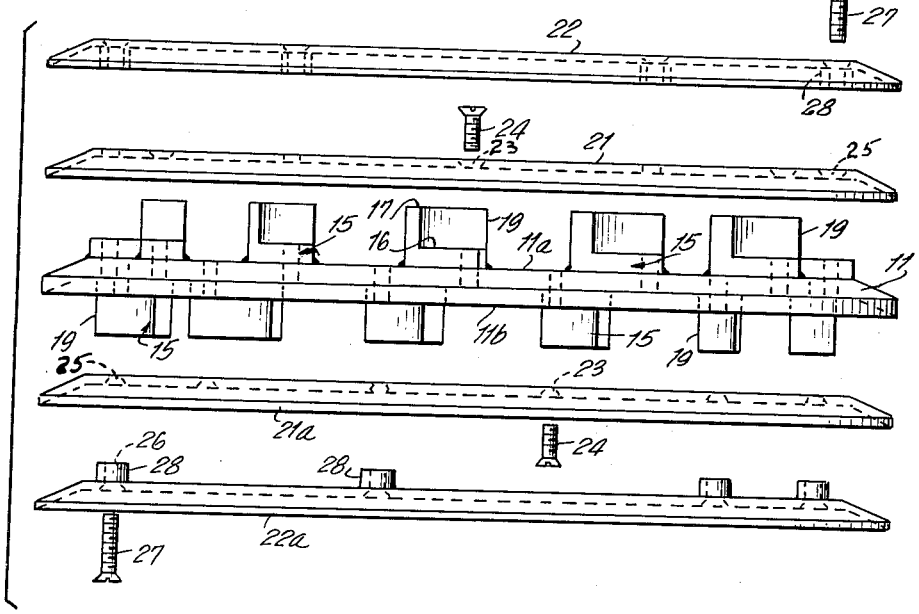
FIG. 4 is an exploded view of FIG. 3.
Figure 5:
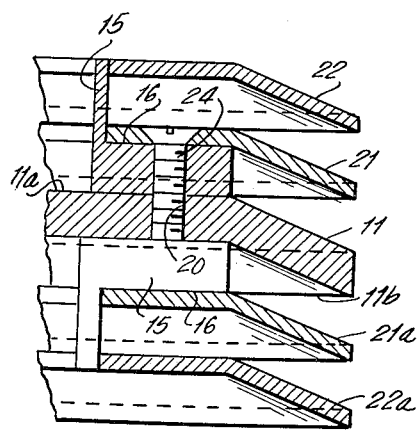
FIG. 5 is an enlarged cross-sectional view, taken on lines 5—5 of FIG. 2.

An identical pair of rings 21a and 22a are secured in the identical position and in the same manner to the undersurface 11b of the disc 11, their outer rims provided with the same downward curve, as shown by FIGS. 3, 4 and 5.

Figure 2:
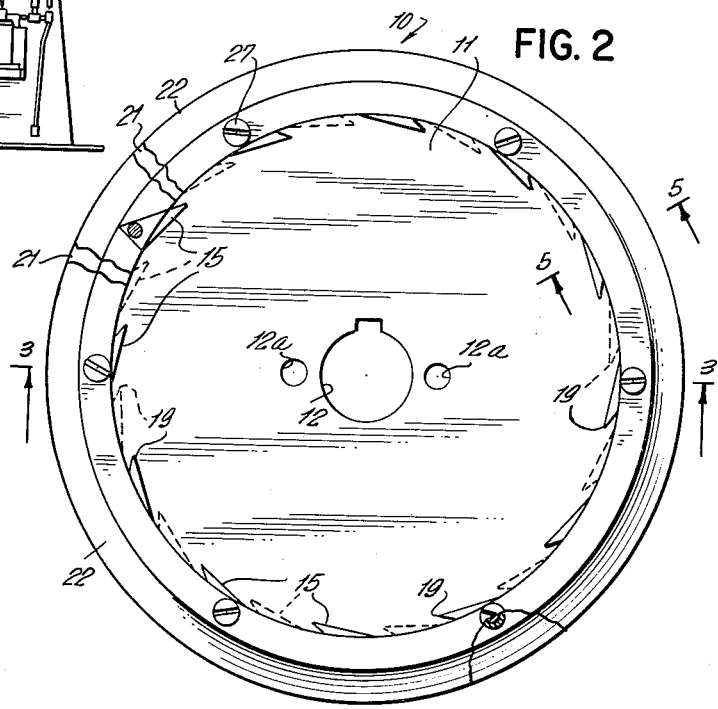
FIG. 2 is a top view, enlarged, of the rotary mixing blade, partly broken away.

As shown by FIG. 2, the cutting edges 19 of the teeth 15 extend at an acute angle from the inner perimeters of the rings 21, 22, 21a and 22a, and, being spaced as previously described, slots are thus formed in the rings 21, 22, 21a and 22a, between the teeth 15.

The disc 11 is adapted to rotate in a clockwise fashion, and the cutting edges 19 of all of the teeth 15, both upper and lower, face in the direction of such rotation so that the cutting edges 19, in operation of the blade 10, are driven against the material to be shredded, deagglomerated, dispersed and emulsified. However, in such instances where motors operate in a counter-clockwise fashion, the blade 10 can be so constructed that the teeth 15 are reversed in position on the disc 11, with their cutting edges 19 facing the direction of the counter-clockwise rotation.

In the operation of our mixing blade 10, the blade 10 and shaft 13 are lowered by pivotal movement of the machine 14, as to which construction we are not presently concerned, into a vat or tank containing the liquid base, preferably off-center, and the blade 10 activated to the speed desired for the particular material to be mixed, which is in solid or semi-solid form. The swirl movement of the liquid draws the solid material into the top and bottom areas of the blade 10, where the teeth 15 shred and break apart the agglomerates at high speed and under intense pressure, forcing and discharging the broken and shredded material through the slots created by the rings 21, 22, 21a and 22a, deflected downward into the direction of the flow by the curvature of the rings. This process is continued by the swirl movement of the liquid, which forces the material repeatedly back into the blade 10. In this manner the action rapidly strips away layers of the softened material, exposing new layers to the action of the blade 10 and the solvent liquid. Great pressure and attrition is thus developed by the simultaneous rubbing and smashing of the fast-moving material against the surfaces of the rings 21, 22, 21a and 22a. Intense shear and excellent wetting is rapidly produced, and agglomerates are quickly reduced in size, dispersed into the solvent and dissolved and emulsified. It is to be noted that the material is acted upon in three directions in each passage through the blade 10. It is shredded and cut vertically, forced horizontally through the slots created by the rings 21, 22, 21a and 22a, and deflected vertically by the curvature of the rings, reduced into solution with rapidity.

By the foregoing action our rotary mixing blade is capable of dispersing, deagglomerating, dissolving and emulsifying such chemical products as paints, lacquers, printing inks, gum and rubber solutions, organisols, plastisols, resins, varnishes, chemical coatings and other chemical materials in solid and semi-solid form.

A further important feature of our invention is to be found in its operation within a vat or tank where the wall or shell acts as a stator, as the material is smashed against it.

Under certain conditions, where the material is of exceptionally low viscosity, or because of the small quantity of material to be mixed, there may be insufficient material to cover the top half of the blade 10 in the operation, causing some air entrapment. Such a condition can be obviated by employing a blank disc, of identical diameter as disc 11, and securing this disc over the top of the blade 10, so that only the bottom half of the blade 10 is used. In intermediate instances the blank disc may be spaced over the blade 10, to "throttle" the action of the upper half of blade 10 sufficiently to prevent air entrapment, while the bottom half is unrestricted in its operation.

While the embodiment shown in the drawings and herein described constitutes a preferred embodiment of our invention, it is clearly to be understood that our invention is not limited to this particular embodiment, but includes as well all the features of novelty and construction possible within the scope of the disclosure and the appended claims. Various changes may be made in the construction, composition and arrangement of parts, as well as substitution of equivalents, without limitations upon or departure from the spirit and scope of the invention, or sacrificing any of the advantages thereof inherent therein.

Having described our invention, we claim:

1. A rotary mixing blade comprising a circular disc, means to secure the disc to a motor shaft, a plurality of concentric rings secured to the disc in parallel, spaced relationship thereto over its outer area, a plurality of teeth integral with the disc in circular spaced relationship to each other, the teeth abutting the inner perimeters of the rings and provided with cutting edges perpendicular to the plane of the disc and extending inwardly at an acute angle from the inner peripheries of the rings, the cutting edges facing in the direction of the rotation of the mixing blade.

2. A rotary mixing blade comprising a circular disc, means to secure the disc to a motor shaft, a plurality of concentric rings secured to each surface of the disc in parallel, spaced relationship thereto over its outer area, a plurality of teeth integral with each surface of the disc in circular, spaced relationship to each other and abutting the inner perimeters of the rings, the teeth provided with cutting edges perpendicular to the plane of the disc and extending at an acute angle from the inner peripheries of the rings, the cutting edges facing in the direction of the rotation of the mixing blade.

3. A rotary mixing blade according to claim 2, the concentric rings and central disc being provided with downwardly curved, parallel outer edges, and being otherwise flat.

4. A rotary mixing blade in accordance with claim 2, in combination with a blank disc of identical size and shape as the disc of the mixing blade and adapted to be adjusted over the top of the mixing blade to affect the operation of the upper half of the mixing blade.

5. A rotary mixing blade comprising a circular disc, means to secure the disc to a motor shaft, a pair of concentric rings secured to each surface of the disc in parallel, spaced relationship thereto over its outer area, a plurality of teeth integral with each surface of the disc in circular, spaced relationship to each other around and abutting the inner peripheries of the respective rings, each of the teeth provided with a cutting edge perpendicular to the plane of the disc and extending at an acute angle from the inner peripheries of the rings, the cutting edges facing in the direction of the rotation of the mixing blade.

6. A rotary mixing blade according to claim 5, the concentric rings and central disc being provided with downwardly curved, parallel outer edges, and being otherwise flat.

7. A rotary mixing blade comprising a circular disc, means to secure the disc to a motor shaft, a pair of concentric rings secured to each surface of the disc in parallel, spaced relationship thereto over its outer area, a plurality of teeth integral with each surface of the disc in circular, spaced relationship to each other around and abutting the inner peripheries of the respective rings, each tooth provided with a cutting edge perpendicular to the plane of the disc, extending inwardly from the peripheries of the rings at an acute angle thereto, the cutting edges facing in the direction of rotation of the mixing blade, the upper and lower teeth being alternately spaced around the respective surfaces of the disc.

8. A rotary mixing blade in accordance with claim 7, in combination with a blank disc of identical size and shape as the disc of the mixing blade and adapted to be adjusted over the top of the mixing blade to affect the operation of the upper half of the mixing blade.

9. A rotary mixing blade comprising a circular disc, means to secure the disc to a motor shaft, a pair of concentric rings secured to each surface of the disc in parallel, spaced relationship thereto over its outer area, the rings and disc provided with downwardly curved outer edges and being otherwise flat, a plurality of teeth integral with each surface of the disc in circular, spaced relationship to each other around and abutting the inner peripheries of the respective rings, each tooth provided with a cutting edge perpendicular to the plane of the disc, extending inwardly from the peripheries of the rings at an acute angle thereto, the cutting edges facing in the direction of rotation of the mixing blade, the upper and lower teeth being alternately spaced around the respective surfaces of the disc.

10. A rotary blade in accordance with claim 9, in combination with a blank disc of identical size and shape as the disc of the rotary blade and adapted to be adjusted over the top of the rotary blade to affect the operation of the upper half of said rotary blade.

References Cited in the file of this patent

UNITED STATES PATENTS

| | | |
|---|---|---|
| 2,626,135 | Serner | Jan. 20, 1953 |
| 2,769,623 | Cawood | Nov. 6, 1956 |